United States Patent Office 2,876,050
Patented Mar. 3, 1959

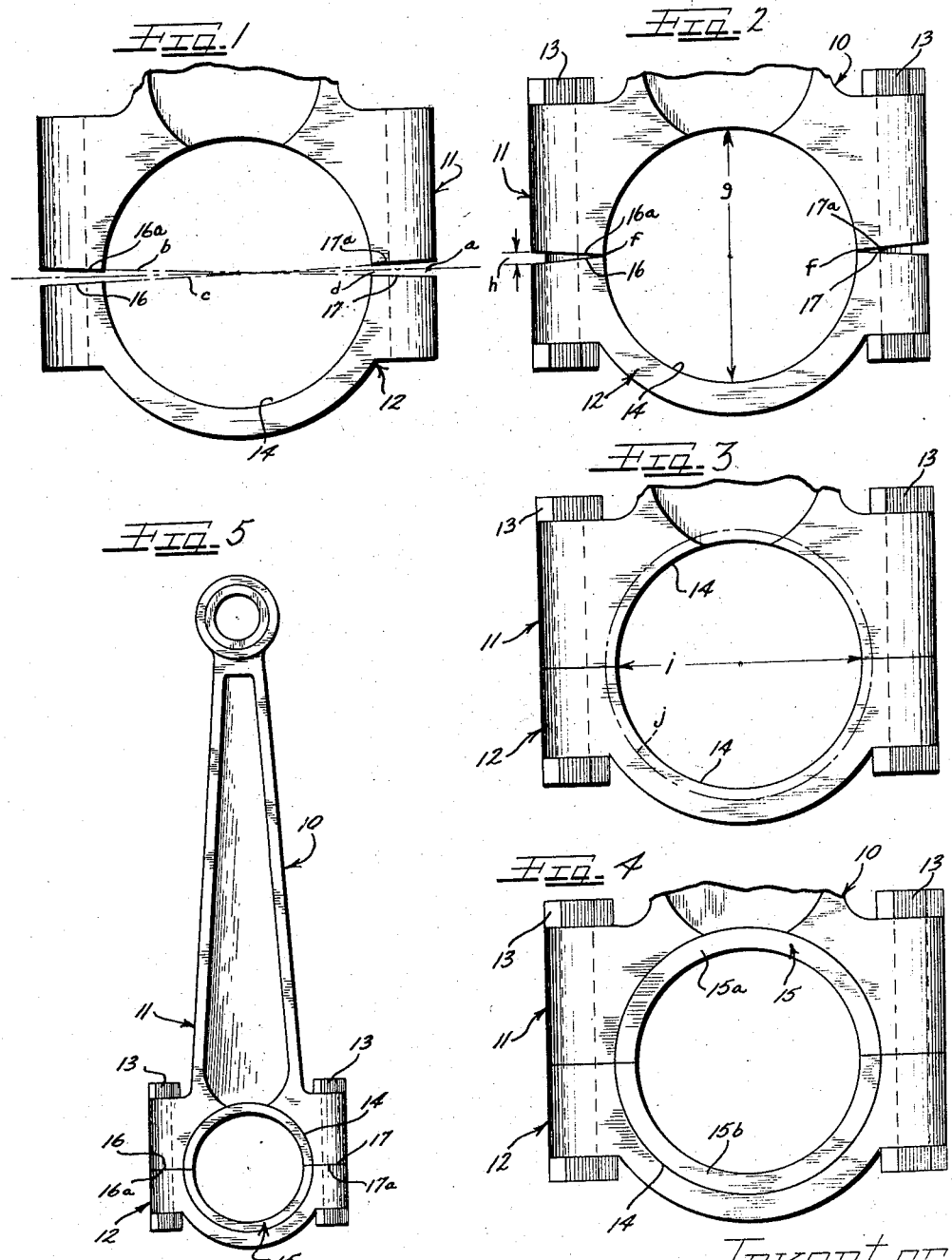

2,876,050

CONNECTING ROD ASSEMBLY

Francis C. Dulin, Columbus, Ohio, assignor to Thompson Products, Inc., Cleveland, Ohio, a corporation of Ohio Original application November 9, 1953, Serial No. 391,041. Divided and this application August 23, 1956, Serial No. 605,739

8 Claims. (Cl. 308—74)

This invention relates generally to a connecting rod assembly. More specifically, the invention relates to a reconditioned connecting rod assembly in which a worn or damaged bearing has been removed from the bearing receiving recess or socket. The recess is then refinished so the damaged recess or socket is again of a precise diameter for receiving a standard replacement bearing.

The reconditioned connecting rod assembly includes superimposed opposite members cooperating between them to define a bearing bore or recess. Each of the members has on opposite sides of the bore a normally inclined surface for mating abutting relation with a similar surface on the opposed member. Also disposed on opposite sides of the bore are tightening elements each comprising a bolt-like element extending generally at right angles to and through the inclined surfaces for drawing the mating normally inclined surfaces toward each into flush contact completely about the shank of the bolt-like element and to eliminate substantially any gap between said surfaces around said bolt-like element whereby the bore is reduced in diameter. The flush contact between the opposite members affords a firm backing between the members to resist distortion and relative movement of the members with respect to the bolt-like elements. The reconditioned assembly and particularly the bearing recess, is adapted to receive a new standard bearing therein.

To recondition the bearing-receiving recess or socket in a connecting rod after the worn or damaged bearing is removed, it is necessary to decrease the diameter of the recess or socket after the bearing is removed so that it can be rebored and reground to a precise size to receive a bearing of standard size. At the present time, it is customary to separate the cap and body sections of a connecting rod, remove the worn bearing halves from the connecting rod body and cap, remove some material from the flat parting surfaces of the cap and body to reduce the dimension of the recess in a direction axially of the rod, bolt the cap on the body, and then reduce the dimension of the recess at right angles to the first direction by pressure on the cooperating cap and body end which will distort these members transversely. This will provide stock at the wall of the recess or socket which can be removed to permit reboring and regrinding to a proper size to receive the standard replacement bearing. Obviously, distorting the cap and body by pressure is damaging to these members and to the bolts which connect them, lacks accuracy, and sometimes after reconnect them, lacks accuracy, and sometimes after removal of pressure, these members spring back to their original size which results in insufficient stock for reboring and regrinding.

An object of this invention is to provide a new and improved reconditioned connecting rod assembly.

Still another object of this invention is to provide a new and improved bearing assembly having the components reconditioned after one or more of the components have become worn or damaged to the end of restoring the usefulness of the assembly.

A further object of this invention is to provide an economical, highly efficient and effective reconditioned connecting rod assembly.

A feature of this invention relates to the provision of inclined or angled parting surfaces disposed on opposite sides of the bearing recess which surfaces, when drawn together, reduce the diameter of the recess to receive a standard replacement bearing.

Another feature of this invention relates to a new and improved connecting rod assembly capable of providing additional stock in the wall of the bearing-receiving recess so the stock may be removed to receive a standard replacement bearing.

Other objects and features of the present invention will more fully become apparent in view of the following detailed description taken in conjunction with the accompanying single sheet of drawings illustrating therein a single embodiment and in which:

Figure 1 is an enlarged fragmentary diagrammatic view illustrating several of the components of my connecting rod assembly in overlying relation to one another;

Figure 2 is an enlarged fragmentary side elevation of my connection rod assembly with the components in tentative or preliminary assembly with one another;

Figure 3 is an enlarged fragmentary side elevation of the connecting rod assembly shown in Figure 2 only with the parting surfaces mated with one another to reduce the bearing recess bore prior to reboring;

Figure 4 is an enlarged fragmentary side elevation of my connecting rod assembly after the bearing recess has been rebored and with a replacement bearing disposed therein; and Fig. 5 is a side elevation of my reconditioned connecting rod assembly.

As shown on the drawings:

With reference to the drawings, I have illustrated in Figure 5 a connecting rod assembly 10 including a connecting rod forging 11 and a cap 12 held in cooperative relationship in the usual manner by bolts 13. These cooperating members provide the usual bearing-receiving circular recess 14 which receives a bearing 15. The bearing 15 is here illustrated as a split ring-type bearing which is made in two halves, 15a and 15b, one of which snaps into the member 11 and the other of which snaps into the member 12 (Figure 4). The member 11 has parting surfaces 16 and 17 and the member 12 has the parting surfaces 16a and 17a. When bolted together the surfaces 16a and 17a are adapted to abut and be in flat backed up contact with the respective surfaces 16 and 17. In this instance, the bearing 15 constitutes a replacement bearing which has been installed in the connecting rod assembly 10 including the forging 11 and the cap 12 after the assembly has been reconditioned.

To replace the worn bearing 15 with a new bearing, the bolts 13 are removed and the worn bearing halves are withdrawn from the respective cooperating members 11 and 12. Then the parting surfaces 16 and 16a and 17 and 17a are prepared in a special manner according to my invention.

As shown in Figures 1 and 2, the parting surfaces 16a and 17a of the cap 12 are ground at an angle so that each surface extends outwardly and upwardly. As further shown in Figures 1 and 2, the parting surfaces 16 and 17 of the body forging 11 are ground at an angle so that each surface extends downwardly and outwardly. The angles of the surfaces 16a and 17a are the same as the angles of the surfaces 16 and 17 but extend in a reverse direction. The result is that when the cap 12 is positioned on the forging 11, as shown in Figure 1, the surfaces 16 and 16a are in outwardly diverging relationship and the surfaces 17 and 17a are in similar diverging relationship.

The manner in which the surfaces are ground and their relationship is indicated in Figure 1. The diameter line *a* indicates the original plane along which the parting surfaces 16 and 16*a* and 17 and 17*a* contact with each other. The line *b* indicates the disposition of the angular surfaces 16*a* and 17 and the line *c* indicates the disposition of the surfaces 16 and 17*a*. It will be noted that a thickness of material, indicated by the letter *d*, is removed from each parting surface at its inner edge and the thickness of material removed gradually increases outwardly to the thickness indicated by the letter *e* at the outer edge of each surface.

The members 11 and 12, with their parting surfaces ground as indicated, are then reassembled as shown in Figure 2. The result will be that the surfaces 16 and 16*a* will be in diverging relationship and the surfaces 17 and 17*a* will be in diverging relationship but will contact at their inner edges at the points indicated by the letters *f*. At this time, the vertical dimension of the recess 14, indicated by the arrow *g*, will be less than the original vertical dimension of the recess being smaller by twice the amount of the material *d* removed from each parting surface at its inner edge. The angle of each parting surface is selected so that the spacing of the surfaces 16 and 16*a* and 17 and 17*a* at their outer edges where they diverge to the greatest extent, indicated by the letter *h*, is approximately twice that of the thickness of material *d* removed from each surface at its inner edge. Thus, when the bolts 13 are tightened to pull the cap 12 down onto member 11, the surfaces 16 and 16*a* and the surfaces 17 and 17*a* will pivot together about the points *f*. This will move the sides of the recess 14 inwardly so that the horizontal dimension of the recess 14, at right angles to the dimension *g*, and indicated by the arrow *i*, will correspond to the vertical dimension *g*. As shown by a comparison of the wall of the recess 14 in Figure 6 with the curved line *j*, which indicates the original position of the wall of the recess, the recess wall has been moved inwardly by a thickness corresponding to twice the thickness *d* or corresponding to the dimension *h*.

After the cap member 12 and forging 11 are assembled and bolted together as indicated in Figure 3, the recess 14 may then be rebored and reground to a precise size to receive a standard bearing. Then, as indicated in Figure 4, the new bearing 15 may be positioned therein.

It will be understood that the angles of the parting surfaces are exaggerated in the drawings for the purpose of illustration. The bolts 13 of the reconditioned connecting rod will be flexed slightly when the cap 12 is clamped on member 11 but not enough to have any undesirable effect.

It will be understood that modifications and variations may be effected without departing from the scope of the novel concepts of the present invention.

This application is a division of application Serial No. 391,041 filed November 9, 1953.

I claim as my invention:

1. In a bearing assembly including a cap and a body in opposed relation with said cap and body cooperable together, the improvements of a bearing receiving recess defined between the cap and body which recess has horizontal and vertical diameters at variance with one another, means for reducing the overall diameter of the recess including the horizontal and the vertical diameter and for generally conforming the horizontal and vertical diameters including spaced sets of parting surfaces with the parting surfaces in each set diverging away from one another in a radially outwardly direction, each of said sets of parting surfaces having a radially movable fulcrum where said parting surfaces abut when said cap and body are placed in preliminary contact with one another, and said means including a second means cooperable with said fulcrums and which pivots the diverging parting surfaces about said fulcrums moving the fulcrums radially toward one another while at the same time mating the parting surfaces along their length to reduce the overall diameter of said recess including the horizontal and vertical diameters and to generally conform the horizontal and vertical diameters.

2. In a bearing assembly including superimposed members in opposed relation with said members cooperable together, the improvements of a bearing receiving recess defined by and positioned between the members which recess has horizontal and vertical diameters at variance with one another, the improvement of means for reducing the overall diameter of the recess and for generally conforming the horizontal and vertical diameters including spaced sets of parting surfaces with the parting surfaces in each set diverging away from one another in a radially outwardly direction, and said means including a second means cooperable with said parting surfaces in each set and which draws the diverging parting surfaces in each set into abutting contact with one another to reduce the overall diameter of said recess and to generally conform the horizontal and vertical diameters.

3. In a bearing assembly including superimposed members with said members cooperable together and defining therebetween a bearing receiving recess, the improvement of means for reducing the diameter of the recess including spaced sets of parting surfaces on said members with the parting surfaces in each set diverging away from one another in a radially outwardly direction, each of said sets of parting surfaces having a fulcrum where said parting surfaces abut when said members are placed in preliminary contact with one another, and said means including a second means cooperable with said fulcrums and which pivots said sets of parting surfaces about their associated fulcrums and draws the diverging parting surfaces in each set into abutting contact with one another to reduce the diameter of said recess.

4. A connecting rod assembly, said assembly including superimposed upper and lower members each having notched portions cooperable together to define a central bearing receiving recess, adjustable tightening means on said assembly to hold said members in assembly, each of said members having a parting surface on opposite sides of said recess, each of said surfaces including an inner surface fulcrum portion with the inner surface portions on each side of the recess in abutting contact with one another in preliminary assembly, said surfaces on each side of the recess each diverging radially outwardly with respect to one another from their respective abutting surface fulcrum portions in preliminary assembly, said divergent surfaces being pivoted on their fulcrum portions and drawn into abutting relation to one another upon tightening of said adjustable tightening means to decrease the diameter of said central bearing receiving recess.

5. A connecting rod assembly, said assembly including superimposed upper and lower members each having notched portions cooperably together to define a central bearing receiving recess, adjustable tightening means on said assembly to hold said members in assembly, each of said members having a resilient leg portion and a parting surface on opposite sides of said recess in face to face relation, each of said surfaces including an inner surface fulcrum portion in abutting contact with another and opposed inner surface fulcrum portion in preliminary assembly, said surfaces on each side of the recess each diverging outwardly with respect to one another from their respective abutting surface fulcrum portions in preliminary assembly, said resilient leg portions and divergent surfaces being pivoted on their fulcrum portions and drawn into abutting relation to one another upon tightening of said adjustable tightening means to decrease the diameter of said central bearing receiving recess, and a removable bearing in said recess.

6. In a clamp structure including a cap and a body in opposed relation with said cap and body cooperable together, the improvements of a recess defined between the cap and body which recess has horizontal and vertical diameters at variance with one another, means for reducing the overall diameter of the recess including the horizontal and the vertical diameter and for generally conforming the horizontal and vertical diameters including spaced sets of parting surfaces with the parting surfaces in each set diverging away from one another in a radially outwardly direction, each of said sets of parting surfaces having a radially movable fulcrum where said parting surfaces abut when said cap and body are placed in preliminary contact with one another, and said means including a second means cooperable with said fulcrums and which pivots the diverging parting surfaces about said fulcrums moving the fulcrums radially toward one another while at the same time mating the parting surfaces along their length to reduce the overall diameter of said recess including the horizontal and vertical diameters and to generally conform the horizontal and vertical diameters.

7. In a clamp structure including superimposed members in opposed relation with said members cooperable together, the improvements of a recess defined by and positioned between the members which recess has horizontal and vertical diameters at variance with one another, the improvement of means for reducing the overall diameter of the recess and for generally conforming the horizontal and vertical diameters including spaced sets of parting surfaces with the parting surfaces in each set diverging away from one another in a radially outwardly direction, and said means including a second means cooperable with said parting surfaces in each set and which draws the diverging parting surfaces in each set into abutting contact with one another to reduce the overall diameter of said recess and to generally conform the horizontal and vertical diameters.

8. In a clamp structure including superimposed members with said members cooperable together and defining therebetween a recess, the improvement of means for reducing the diameter of the recess including spaced sets of parting surfaces on said members with the parting surfaces in each set diverging away from one another in a radially outwardly direction, each of said sets of parting surfaces having a fulcrum where said parting surfaces abut when said members are placed in preliminary contact with one another, and said means including a second means cooperable with said fulcrums and which pivots said sets of parting surfaces about their associated fulcrums and draws the diverging parting surfaces in each set into abutting contact with one another to reduce the diameter of said recess.

References Cited in the file of this patent

UNITED STATES PATENTS

| | | |
|---|---|---|
| 948,080 | Stockham | Feb. 1, 1910 |
| 2,082,944 | Evans | June 8, 1937 |

FOREIGN PATENTS

| | | |
|---|---|---|
| 585,534 | Great Britain | Feb. 10, 1947 |
| 834,624 | Germany | Mar. 20, 1952 |